United States Patent [19]
Satoh

[11] Patent Number: 4,698,570
[45] Date of Patent: Oct. 6, 1987

[54] BOOM POSITIONING APPARATUS FOR ROCK DRILL

[75] Inventor: Osamu Satoh, Higashihiroshima, Japan

[73] Assignee: Mazda Motor Corporation, Hiroshima, Japan

[21] Appl. No.: 854,916

[22] Filed: Apr. 23, 1986

[30] Foreign Application Priority Data

Apr. 30, 1985 [JP] Japan .................................. 60-94350

[51] Int. Cl.⁴ ............................................. G05B 19/10
[52] U.S. Cl. .................................. 318/568; 318/632; 364/513; 364/170; 173/43
[58] Field of Search ................ 318/568, 568 E, 568 H, 318/632, 561; 173/1, 43, 11, 39, 44; 364/474, 170, 513; 901/9, 16, 17, 18

[56] References Cited

U.S. PATENT DOCUMENTS

| 4,113,033 | 9/1978 | Lindblad | 173/1 |
|---|---|---|---|
| 4,140,953 | 2/1979 | Dunne | 318/568 |
| 4,240,511 | 12/1980 | Mashimo | 173/1 |
| 4,362,977 | 12/1982 | Evans | 318/568 |
| 4,362,978 | 12/1982 | Pollard | 318/568 |
| 4,511,985 | 4/1985 | Inaba | 318/568 |
| 4,514,796 | 4/1985 | Saulters | 173/43 |
| 4,517,653 | 5/1985 | Tsuchihashi | 318/568 |
| 4,530,062 | 7/1985 | Inaba | 318/568 |
| 4,542,794 | 9/1985 | Bjor | 173/43 |
| 4,594,670 | 6/1986 | Itoh | 318/568 |
| 4,595,989 | 6/1986 | Yasukawa | 318/568 |

Primary Examiner—Bernard Roskoski
Assistant Examiner—Patrick C. Keane
Attorney, Agent, or Firm—Burns, Doane, Swecker & Mathis

[57] ABSTRACT

A boom positioning apparatus for a rock drill, including a boom mounted with a drilling apparatus, an input device for determining, as set values expressed in a rectangular coordinate system, positions and directions of a number of drilling points formed on a drilling plane disposed immediately in front of a facing so as to transform the set values into values expressed in a coordinate system defined with respect to the boom, respectively, a compensating device for adding compensation values to the set values such that actual drilling positions are located at normal positions of the drilling points, respectively, a boom positioning servo control device, a feedback device for feeding displacement amounts of the boom back to the boom positioning servo control device and a control unit for controlling the drilling apparatus.

4 Claims, 8 Drawing Figures

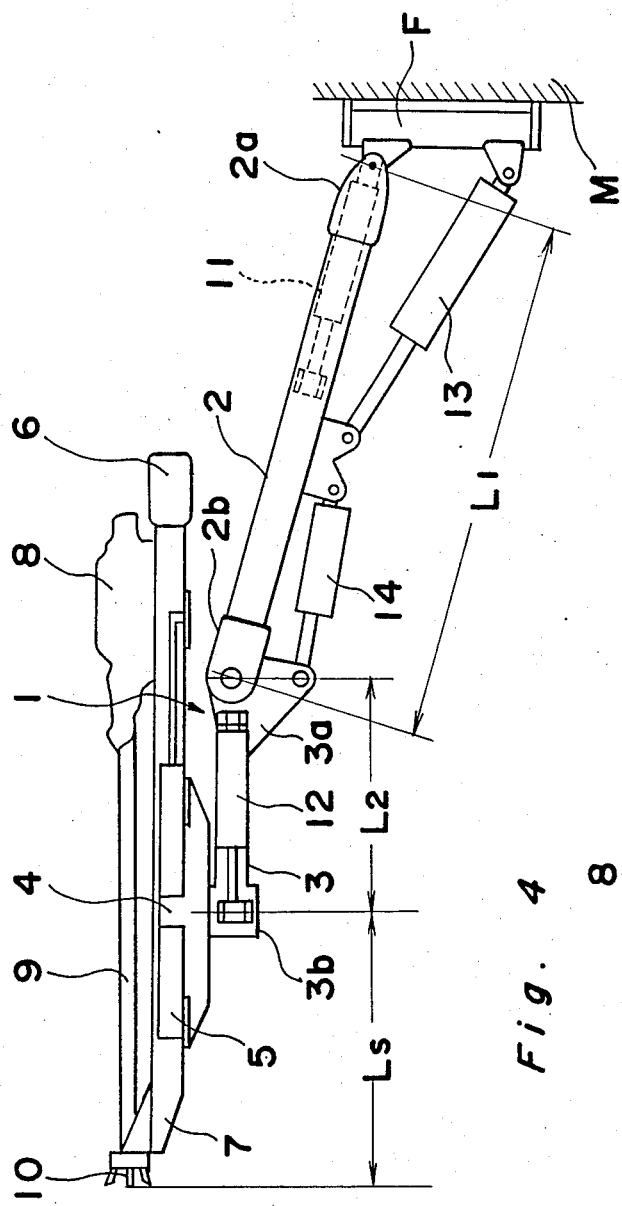
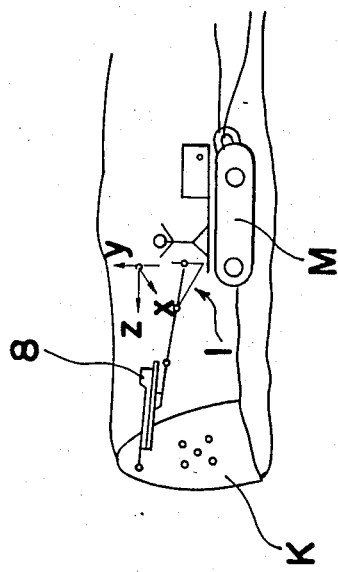

BOOM POSITIONING APPARATUS FOR ROCK DRILL

BACKGROUND OF THE INVENTION

The present invention generally relates to a rock drill and more particularly, to a boom positioning apparatus for positioning a boom of the rock drill, which enables accurate drilling of the rock drill through elimination of errors due to vibrations and deflection of the boom.

Previously, the assignee assigned by the present inventor proposed in U.S. Pat. No. 4,240,511, a boom positioning apparatus in which an automatic positioning program of the boom can be composed easily by expressing a desired position of the drilling apparatus mounted on the boom in a rectangular coordinate system and a foremost position of the boom is designated numerically such that the boom can be rapidly positioned at a desired position. This known boom positioning apparatus has such an advantage that the boom can be rapidly positioned at the desired position. However, the known boom positioning apparatus is disadvantageous in that since a drilling operation is performed through automatic positioning of the boom by numerically inputting data of a drilling pattern, the boom may not be positioned at a predetermined position due to vibrations of a hinge for the boom, a machining error of length of the boom, deflection of the boom, control errors, etc.

SUMMARY OF THE INVENTION

Accordingly, the present invention has for its object, with a view to eliminating the disadvantages inherent in conventional boom positioning apparatuses, to provide a boom positioning apparatus for a rock drill, in which error data are formulated by obtaining an error between a set value and an actual measurement of a drilling point and thus, subsequent drilling operations are performed on the basis of the set value compensated for by the error data such that errors produced due to vibrations of a hinge of a boom, etc. can be wholly incorporated into the set value, thereby resulting in highly accurate positioning of the boom.

In order to accomplish this object of the present invention, a boom positioning apparatus for a rock drill, according to the present invention comprises: a boom means which has a drilling apparatus mounted thereon; an input means which determines, as set values expressed in a rectangular coordinate system, positions and directions of a number of drilling points formed on a drilling plane disposed immediately in front of a facing so as to transform the set values into values expressed in a coordinate system defined with respect to said boom means, respectively; a compensating means which adds compensation values to the set values into compensated set values, respectively such that actual drilling positions are located at normal positions of the drilling points; a positioning servo control means for displacing said boom means in accordance with the values from said input means; a feedback means which detects displacement amounts of said boom means so as to feed back to said positioning servo control means signals indicative of the displacement amounts of said boom means, respectively; and a control device for controlling said drilling apparatus, which actuates said drilling apparatus in response to signals from said positioning servo control means.

In accordance with the present invention, since errors due to wearing of a hinge for the boom, etc. are incorporated into the set value by the compensating means, such an undesirable phenomenon can be eliminated that actual drilling positions deviate from predetermined drilling positions.

BRIEF DESCRIPTIONS OF THE DRAWINGS

This object and features of the present invention will become apparent from the following description taken in conjunction with the preferred embodiments thereof with reference to the accompanying drawings, in which:

FIG. 3 is a fragmentary side elevational view of a rock drill to which the boom positioning apparatus of the present invention may be applied;

FIG. 4 is a schematic view indicative of operation of the rock drill of FIG. 3;

Before the description of the present invention proceeds, it is to be noted that like parts are designated by like reference numerals throughout several views of the accompanying drawings.

DETAILED DESCRIPTION OF THE INVENTION

Figure 1:
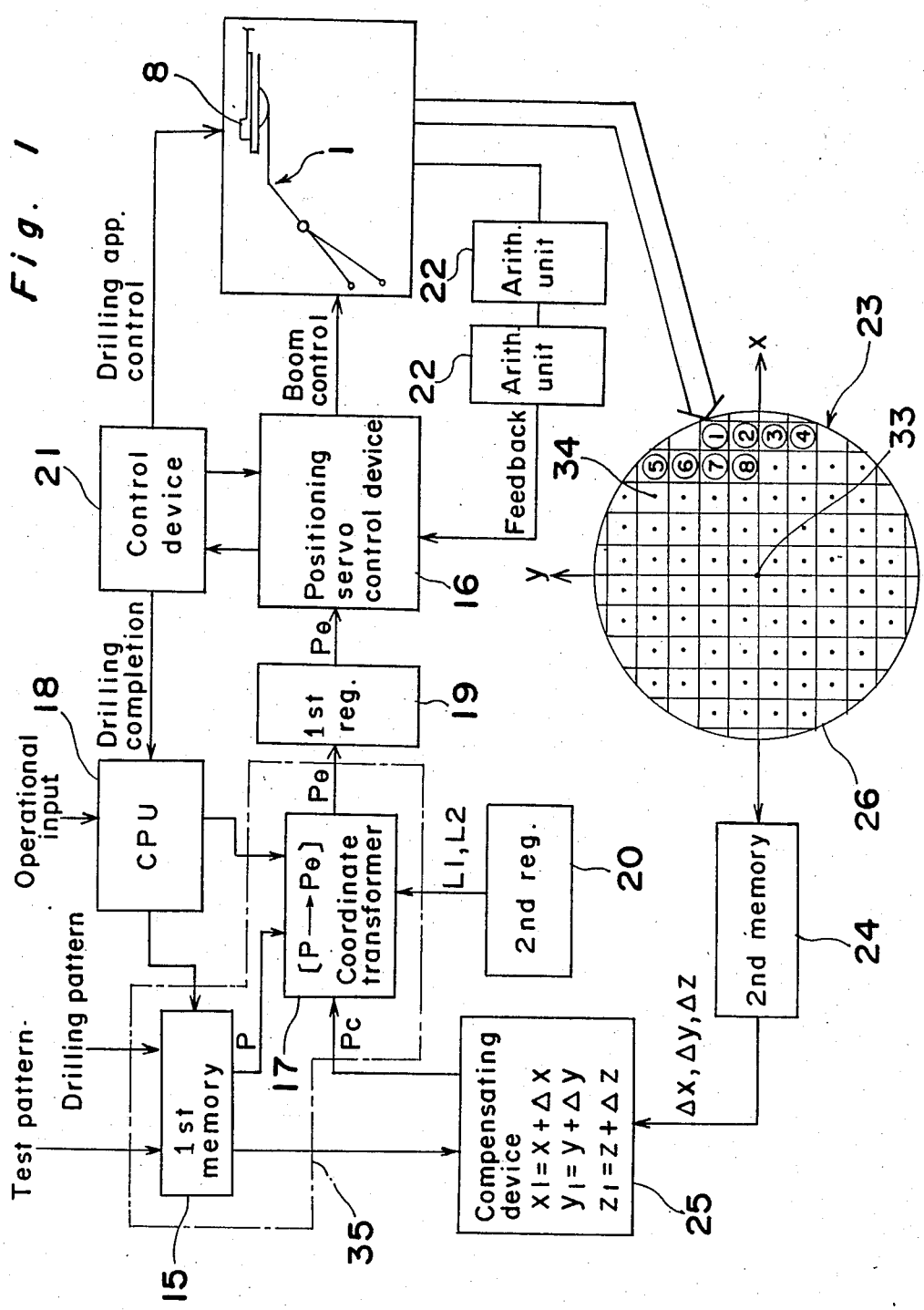
FIG. 1 is a block diagram of a boom positioning apparatus according to a first embodiment of the present invention.

Referring now to the drawings, there is shown in FIG. 3, a boom mounting apparatus for a rock drill, to which a boom positioning apparatus according to the present invention may be applied. In FIG. 3, a boom 1 is constituted by a first boom 2 and a second boom 3. The first boom 2 is rotatably supported, at its rear end 2a, by a base secured to a drilling vehicle M, while the second boom 3 is rotatably supported, at its rear end 3a, by a front end 2b of the first boom 2. A cylinder 5 for displacing a guide cell 7 is secured, through a cell mounting 4, to a front end 3b of the second boom 3. A feed motor 6 is mounted on a rear end portion of the guide cell 7. The guide cell 7 is slidably mounted on the cylinder 5 so as to be moved forwardly and rearwardly, i.e. towards and away from a facing K (FIG. 4) upon actuation of the cylinder 5. A drilling apparatus (drifter) 8, which is provided with a rod 9 having, at its front end, a bit 10, is mounted on the guide cell 7 so as to be moved forwardly and rearwardly. The drilling apparatus 8 is moved forwardly by the feed motor 6 during a drilling operation.

As shown in FIG. 4, the boom 1 having the drilling apparatus 8 mounted thereon is arranged to be displaced in three directions, i.e. in a lateral horizontal direction of an x-axis, a longitudinal horizontal direction of a z-axis and a vertical direction of a y-axis of a three-dimensional rectangular coordinate system defined with respect to the drilling vehicle M. To this end, a cylinder 11 for horizontally swinging the boom 1 and a cylinder 12 for horizontally swinging the guide cell 7 are, respectively, attached to the first boom 2 and the second boom 3, while a cylinder 13 for vertically lifting the boom 1 and a cylinder 14 for vertically lifting the guide cell 7 are attached as shown.

Figure 5A:
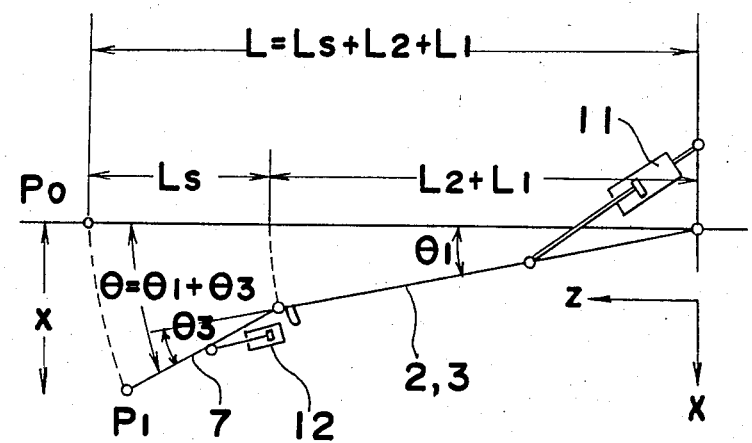
FIGS. 5A and 5B are views explanatory of horizontal displacement and vertical displacement of a boom of FIG. 3, respectively.
Figure 5B:
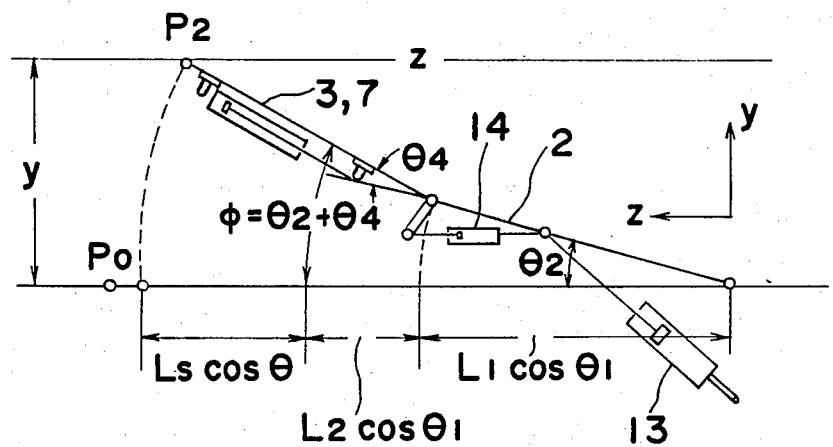

Hereinbelow, a boom positioning apparatus according to a first embodiment of the present invention will be described with reference to FIG. 1. The boom positioning apparatus includes a first memory 15, a positioning servo control device 16 for the boom 1 and a coordinate transformer 17. The first memory 15 is used for setting working distances for directly positioning a front end of the boom 1 relative to an x-y plane of an imaginary rectangular coordinate system defined immediately in front of the facing K. Working distances of the first boom 2 and the second boom 3 can be arbitrarily stored in the first memory 15 by using a dial, etc. The positioning servo control device 16 for the boom 1 determines working distances of the pistons of the hydraulic cylinders 11 to 14 and 5 on the basis of displacement angles $\theta 1$, $\theta 2$, $\theta 3$ and $\theta 4$ (FIGS. 5A and 5B) of the first and second booms 2 and 3 of the boom 1. The coordinate transformer 17 is provided between the first memory 15 and the positioning servo control device 16. Supposing that a character Ls represents a displacement distance of the guide cell 7, a position and a direction (x, y, z, $\theta$, $\phi$) of a set value P, which are expressed in a rectangular coordinate system to be described later and are given to the coordinate transformer 17 by the first memory 15, are transformed by the coordinate transformer 17 into coordinates ($\theta 1$, $\theta 2$, $\theta 3$, $\theta 4$, Ls) of a set value P$\theta$, which are expressed in a boom coordinate system defined with respect to the boom 1.

The boom positioning apparatus further includes a central processing unit (CPU) 18, a first register 19, a second register 20 and a control device 21 for controlling the drilling apparatus 18. The CPU 18 is connected to the first memory 15 and the coordinate transformer 17. When an operational input is applied to the CPU 18, the CPU 18 fetches the set value P from the first memory 15 so as to input the set value P to the coordinate transformer 17. The first memory 15 and the coordinate transformer 17 constitutes an input device 35 for actuating the positioning servo control device 16. The first register 19 is provided between the coordinate transformer 17 and the positioning servo control device 16. The first register 19 is arranged to store the set value P$\theta$ given by the coordinate transformer 17 and deliver the set value P$\theta$ to the positioning servo control device 16. Meanwhile, the second register 20 transmits to the coordinate transformer 17 constants such as a length L1 of the first boom 2, a length L2 of the second boom 3, etc. The hydraulic cylinders 5 and 11 to 14 for driving the guide cell 7 and the boom 1 are connected to the positioning servo control device 16 so as to be actuated in accordance with the working distances of the pistons of the cylinders 5 and 11 to 14, which are commanded by the positioning servo control device 16. The control device 21 delivers to the drilling apparatus 8 control signals required for the drilling operation of the drilling apparatus 8. The control device 21 is connected to the positioning servo control device 16 so as to start the drilling operation in response to a signal for positioning the boom 1 at a desired position. The control device 21 is further connected to the CPU 18 so as to deliver a completion signal of each drilling operation to the CPU 18.

Furthermore, the boom positioning apparatus includes a pair of arithmetic units 22 for obtaining displacement angles of the boom 1 in response to detection signals of displacements of the cylinders 11 to 14 and 5. The arithmetic units 22 are connected to the positioning servo control device 16 so as to feed the displacement angles $\theta 1$, $\theta 2$, $\theta 3$ and $\theta 4$ of the boom 1 and the displacement distance Ls of the guide cell 7 back to the positioning servo control device 16 such that the boom 1 is positioned.

In order to raise positioning accuracy of the boom positioning apparatus, the boom positioning apparatus is further provided with an error block map 23, a second memory 24 and a compensating device 25. In the error block map 23, a travel region 26 of the boom 1 is divided into a plurality of blocks ①, ②, ③, . . . In order to formulate the error block map 23, a test pattern prepared for setting the boom 1 at a reference point, for example a central point 34 of each of the blocks ①, ②, ③, . . . is inputted to the first memory 15 and then, an error between an actually measured point and the reference point is obtained at each of the blocks ①, ②, ③, . . . The error block map 23 is stored, as error data, in the second memory 24. The above described measurement is performed manually by using, for example, a measuring device. Meanwhile, a reference numeral 33 denotes a center of the boom 1. The compensating device 25 fetches the set value P (x, y, z, $\theta$, $\phi$) of the drilling position and the number of each of the blocks ①, ②, ③, . . . from the first memory 15. Meanwhile, the compensating device 25 fetches from the second memory 24 errors corresponding to said number of each of the blocks ①, ②, ③, . . . and add, as compensation values, the errors to the set value P into a compensated set value Pc so as to input the compensated set value Pc to the coordinate transformer 17.

Hereinbelow, a method of expressing an arbitrary position of the drilling apparatus 8 mounted on the boom 1 in a rectangular coordinate system will be described. Relation between the working distances of the cylinders 11 to 14 and a foremost position of the boom 1 displaced upon actuation of the cylinders 11 to 14, i.e. a foremost position of the guide cell 7 are analyzed as follows with reference to FIGS. 5A and 5B. Meanwhile, it is to be noted that characters L1, L2 and Ls denote a length of the first boom 2, a length of the second boom 3 and a distance between a front end of the second boom 3 and a front end of the guide cell 7, namely a displacement distance of the guide cell 7, respectively. When the boom 1 is disposed on the z-axis, the front end of the boom 1 is positioned at a point P0 in FIGS. 5A and 5B. Initially, the cylinder 11 for horizontally swinging the boom 1 and the cylinder 12 for horizontally swinging guide cell 7 are actuated. Thus, when, upon extension of the piston rods of the cylinders 11 and 12, the first and second booms 3 and 4 are displaced through an angle $\theta 1$ and the guide cell 7 is displaced through an angle $\theta 3$ in a horizontal x-z plane of FIG. 5A, the point P0 is displaced to a point P1. Subsequently, the cylinder 13 for lifting the boom 1 and the cylinder 14 for lifting the guide cell 7 are actuated. Hence, when the first boom 2 is displaced through an angle $\theta 2$ and the second boom 3 and the guide cell 7 are displaced through an angle $\theta 4$ in a vertical y-z plane of FIG. 5B, the point P1 is displaced to a point P2. The position and direction of the point P2 are given by the following equations (1).

$$\begin{aligned}
x &= L1\sin\theta1\cdot\cos\theta2 + [L2\sin\theta1 + Ls\sin(\theta1+\theta3)]\\
&\quad \cos(\theta2+\theta4)\\
y &= L1\cos\theta1\cdot\sin\theta2 + [L2\cos\theta1 + Ls\cos(\theta1+\theta3)]\\
&\quad \sin(\theta2+\theta4)\\
z &= L1\cos\theta1\cdot\cos\theta2 + [L2\cos\theta1 + Ls\cos(\theta1+\theta3)]\\
&\quad \cos(\theta2+\theta4)\\
\theta &= \theta1 + \theta3\\
\phi &= \theta2 + \theta4
\end{aligned} \quad (1)$$

Namely, transformation between the position and direction of the point P2 expressed in the rectangular coordinate system P(x, y, z, $\theta$, $\phi$) and those expressed in the boom coordinate system P$\theta$($\theta$1, $\theta$2, $\theta$3, $\theta$4, Ls) defined with respect to the boom 1 can be performed by using the equations (1). Accordingly, if a coordinate transformer for transforming the rectangular coordinate system P to the boom coordinate system P$\theta$ and a positioning servo control device for controlling the angles $\theta$1, $\theta$2, $\theta$3 and $\theta$4 and the length Ls are provided, it becomes possible to control the position and direction of the point P2 expressed in the rectangular coordinate system.

Then, a principle for detecting the displacement angles $\theta$1 to $\theta$4 of the boom 1 from the displacements of the cylinders 11 to 14 directly without the arithmetic units 22 or indirectly by the use of the arithmetic units 22 is described with reference to FIG. 6. When the first boom 2 is held at a horizontal position in FIG. 6, a triangle X1X2X3 is a right triangle. Therefore, supposing that sides of the triangle X1X2X3 have lengths a, b and c as shown, the following equation (2) is established.

$$a^2 = b^2 + c^2 \quad (2)$$

Meanwhile, when the first boom 2 is upwardly displaced through an angle $\alpha$, the point X1 is displaced to a point X1' and the length a between the points X1 and X3 increases by a distance t. Then, the following equation (3) is established.

$$(a+t)^2 = (b + c\sin\alpha)^2 + (c\cos\alpha)^2 \quad (3)$$
$$= b^2 + c^2 + 2bc\sin\alpha$$

From the equations (2) and (3), the following equation (4) is obtained.

$$t^2 + 2at = 2bc\sin\alpha$$

Therefore, $$\sin\alpha = \frac{t^2 + 2at}{2bc} \quad (4)$$

Therefore, the angle $\alpha$ is given by the following equation (5).

$$\alpha = \sin^{-1}\frac{t^2 + 2at}{2bc} \quad (5)$$

In order to make the variable of the equation (5) nondimensional, the term at/bc is replaced by a character T.

$$at/bc = T \quad (6)$$

Thus, the equation (5) is changed as follows.

$$\alpha = \sin^{-1}\left(\frac{bc}{2a^2}T^2 + T\right) \quad (7)$$

Supposing that a triangle Q1Q2Q3 is similar to the triangle X1'X2X3 and sides of the triangle Q1Q2Q3 corresponding to those of the triangle X1'X2X3 have lengths (a'+t'), b' and c', the following equation (8) is obtained.

$$a/a' = b/b' = c/c' = t/t' = k_1 \text{ (constant)} \quad (8)$$

Therefore, $$T = at/bc = a't'/b'c' \quad (9)$$

Furthermore, the constant (bc/a$^2$) of the equation (7) can be expressed as follows.

$$bc/a^2 = b'c'/a'^2 = k_2 \text{ (constant)} \quad (10)$$

Accordingly, it will be understood between similar triangles that the constant (bc/a$^2$) and the variable T of the equation (7) do not depend upon size of the triangle and the angle $\alpha$ can be expressed by the same equation (7). By using the constant k$_2$, the equation (7) can be changed as follows.

$$\alpha = \sin^{-1}\left(\frac{k_2}{2}T^2 + T\right) \quad (11)$$

Thus, the angle $\alpha$ of the first boom 2 can be obtained from the displacement T of the cylinder 11 by using the equation (11). More specifically, to this end, the two arithmetic units 22, preferably digital arithmetic units are employed as follows.

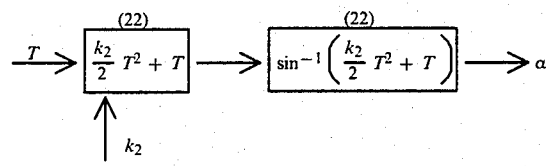

Figure 7:
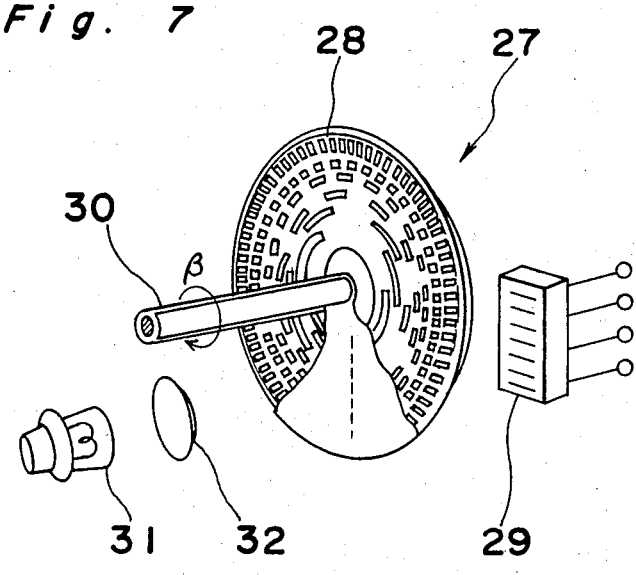
FIG. 7 is an exploded perspective view of an encoder employed in the boom positioning apparatus of the present invention.

In order to detect the displacement T of the cylinder 11, an encoder 27 incorporated in the cylinder 11 is employed as shown in FIG. 7. It should be noted that although only the cylinder 11 has been described so far, the above described principle is likewise applied to the other cylinders 12 to 14. The encoder 27 is mounted on the inner base end of the hydraulic cylinders 11 to 14. In the encoder 27, a rotary disc 28 and a sensor 29 are provided in a casing secured to each of the cylinders 11 to 14 such that the rotary disc 28 is rotated through a shaft 30 upon inflow of working fluid. Physically encoded patterns of 1 and 0 are stored in the rotary disc 28 and are detected by the sensor 29. Since light is used as a physical amount in this example, a lamp 31 acting as a light source and a condenser lens 32 are provided and a phototransistor is employed as the sensor 29. A rotational angle $\beta$ of the rotary disc 28 and the output signal T are expressed by the following equation (12).

$$T = k\beta \quad (12)$$

where k is a constant.

Accordingly, if the patterns of the rotary disc 28 of the encoder 27 are changed such that the encoder 27 acts as a function generator satisfying the equation (11) in place of the equation (12), the angle α can be obtained directly from the encoder 27. In order to obtain the patterns of the rotary disc 28 of the function generator (encoder) satisfying the equation (11), the equation (12) is substituted for the equation (11) as follows.

$$\alpha = \sin^{-1}\left(\frac{k_2}{2} k^2\beta^2 + k\beta\right) \quad (13)$$

By solving the equation (13) for β, the following equation (14) is obtained.

$$\beta = \frac{-1 + \sqrt{1 + 2k_2 \sin\alpha}}{k_2 k} \quad (14)$$

In the above equation (14), since the rotational angle β is not restricted to a negative value, plus sign is employed. Furthermore, in the equation (14), the radical $(1 + 2k_2 \sin\alpha)$ is positive. Namely, by using the equation (14), the rotational angle β of the rotary disc 28 corresponding to the angle α of each of the first and second booms 2 and 3 can be obtained.

Figure 6:
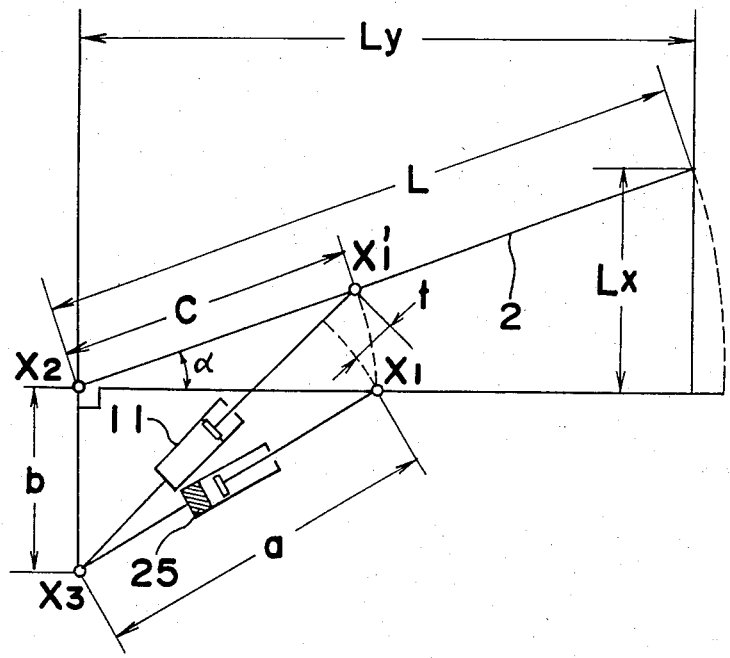
FIG. 6 is a view explanatory of relation between a displacement angle of the boom and a displacement amount of a cylinder of FIG. 3.

Meanwhile, by employing a method in which the encoder 27 is used as a special function generator, distances Lx and Ly in FIG. 6 can be detected.

Operations of the boom positioning apparatus of the above described arrangement are described, hereinbelow. In FIG. 1, drilling patterns of the drilling apparatus 8, which are expressed in the rectangular coordinate system, and the block numbers are stored in the first memory 15. Subsequently, when the operational input has been inputted to the CPU 18, data concerning the set value P (x, y, z, θ, φ) and the block number of a desired drilling point are fetched from the first memory 15 to the compensating device 25 by a command of the CPU 18. Meanwhile, errors Δx, Δy and Δz corresponding to the above described block number are fetched, as compensation values, from the second memory 24 to the compensating device 25. Thus, in the compensating device 25, compensation of the set value P is performed, namely the coordinates x, y and z are set to coordinates x1(=x+Δx), y1(=y+Δy) and z1(=z+Δz), respectively and thus, a compensated set value Pc (x1, y1, z1) is obtained. The compensated set value Pc from the compensating device 25, the lengths L1 and L2 of the first and second booms 2 and 3 from the second register 20, etc. are inputted to the coordinate transformer 17. Hence, the set value P is transformed into the set value Pθ by the coordinate transformer 17. The set value Pθ expressed in the boom coordinate system is stored in the first register 19. On the basis of the set value Pθ, the cylinders 5 and 11 to 14 are actuated by the positioning servo mechanism 16 so as to extend the pistons such that the front end of the boom 1 reaches a desired position. Simultaneously at this time, the displacement angles of the first and second booms 2 and 3 are detected from the displacements of the pistons of the cylinders 5 and 11 to 14 and are fed back to the positioning servo control device 16. Upon completion of positioning of the front end of the boom 1, the drilling apparatus 8 is controlled by the control device 21 so as to perform a drilling operation. Upon completion of the drilling operation, a drilling completion signal is fed from the control device 21 to the CPU 18 and then, a signal for calling the next drilling pattern and block number is delivered from the CPU 18 to the first memory 15. Thereafter, positioning of the boom 1 and the drilling operation are performed in the above described sequence. This procedure is sequentially repeated and thus, the drilling operations based on one pattern are completed.

In the above described embodiment, the drilling patterns are inputted to the first memory 15 and the set value P expressed in the rectangular coordinate system is stored in the first memory 15. Furthermore, the set value P is transformed by the coordinate transformer 17 into the set value Pθ expressed in the boom coordinate system defined with respect to the boom 1 and then, the set value Pθ is inputted to the positioning servo control device 16. However, it can also be so managed that processes for transforming the set value P into the set value Pθ expressed in the boom coordinate system are performed externally, namely, an external device is employed as the input device 35 such that the set value Pθ expressed in the boom coordinate system is directly inputted to the positioning servo control device 16 by keying.

Figure 2:
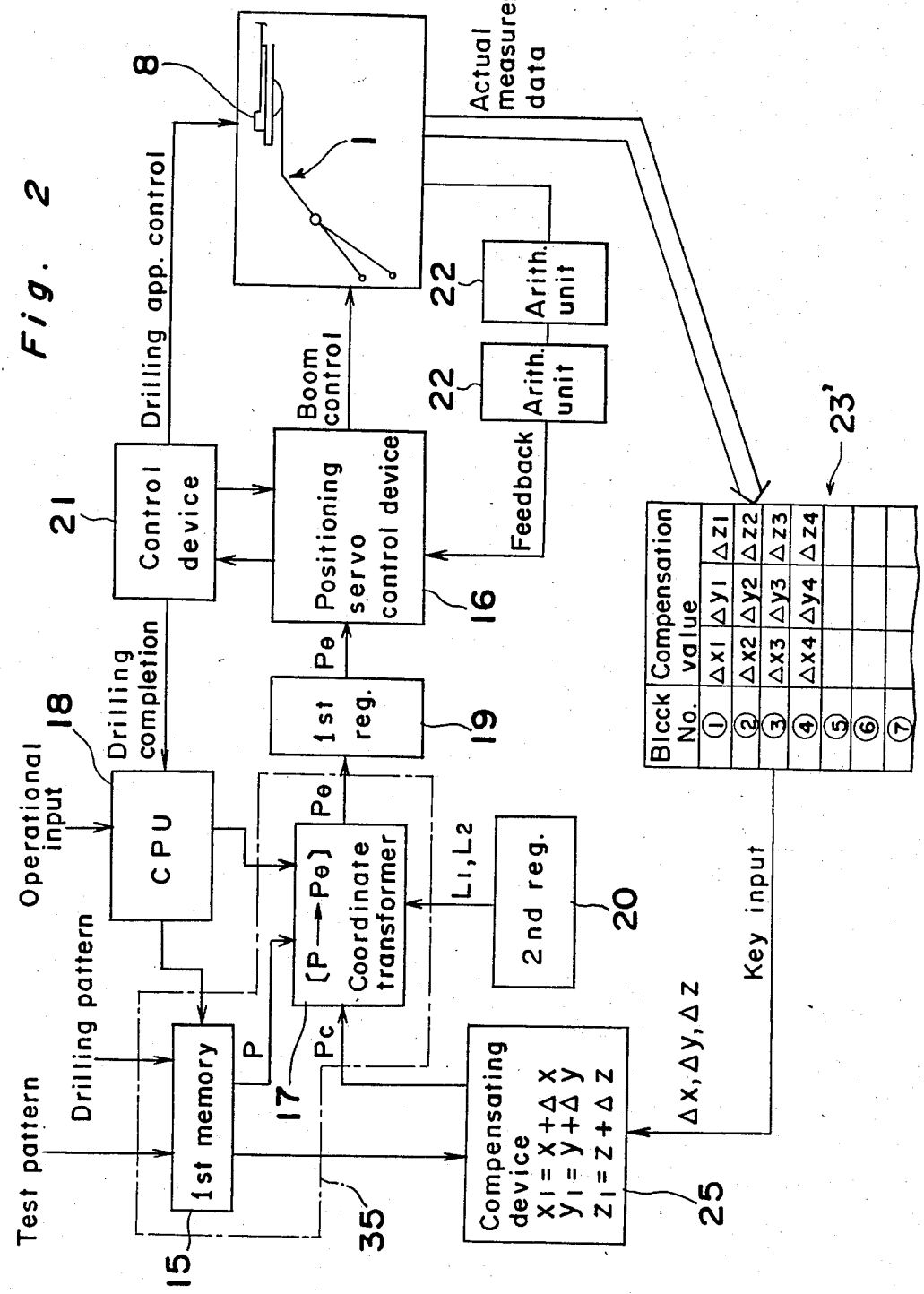
FIG. 2 is a view similar to FIG. 1, particularly showing a second embodiment of the present invention.

Meanwhile, in the above described embodiment, the error block map 23 is stored, as the error data, in the second memory 24 such that the compensating device 25 fetches the errors corresponding to the block numbers from the second memory 24. However, as shown in FIG. 2, the error block map 23 and the second memory 24 may be replaced by a synoptical table 23′ showing the errors for the respective block numbers such that the errors corresponding to the block numbers can be directly inputted to the compensating device 25 by keying.

As is clear from the foregoing description, in accordance with the present invention, since the compensating device for compensating for the set value of the drilling point on the basis of difference between the set value and the actual measurement, error associated with mounting of the boom on the drilling vehicle, errors due to wearing of the hinge for the boom and deflection of the boom, etc. can be eliminated, thereby resulting in highly accurate positioning of the boom.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A boom positioning apparatus for a rock drill, comprising:

a boom means which has a drilling apparatus mounted thereon;

an input means which determines, as set values expressed in a rectangular coordinate system, positions and directions of a number of drilling points formed on a drilling plane disposed immediately in front of a facing, a working area of said boom means being divided into a plurality of blocks such that the drilling points are, respectively, alloted to the blocks, said blocks being assigned block numbers;

a compensating means which adds compensation values to change the set values into compensated set values respectively such that actual drilling positions are located at normal positions of the drilling points, respectively, said compensating means receiving the set values of the drilling points from said input means and inputting the compensated set values back into said input means, said compensating means further receiving from said input means the block numbers corresponding respectively to the set values;

a memory means for storing the compensation values for the set values allotted to the blocks respectively such that said compensating means calls from said memory means the compensation values for the blocks, on the basis of the block numbers, corresponding to the set values inputted to said compensating means respectively;

positioning servo control means for displacing said boom means in accordance with the compensated set values from said input means;

a feedback means which detects displacement amounts of said boom means so as to feed back to said positioning servo control means signals indicative of the displacement amounts of said boom means respectively; and a control device for controlling said drilling apparatus, which actuates said drilling apparatus in response to signals from said positioning servo control means.

2. A boom positioning apparatus as claimed in claim 1, wherein the compensation values are actually measured at the blocks, respectively so as to obtain actual measurements of the compensation values such that the actual measurements of the compensation values are inputted to said compensating means.

3. A boom positioning apparatus as claimed in claim 1, wherein said input means includes an input means memory and a coordinate transformer.

4. A boom positioning apparatus as claimed in claim 1, further comprising:

a central processing unit which is provided between said input means and said control device.

* * * * *